(12) United States Patent
Conner, Jr.

(10) Patent No.: US 11,447,925 B2
(45) Date of Patent: Sep. 20, 2022

(54) RETROFITTABLE CONVERSION TINE SYSTEM FOR BUCKET LOADERS

(71) Applicant: Robert L. Conner, Jr., Mountain Home, AR (US)

(72) Inventor: Robert L. Conner, Jr., Mountain Home, AR (US)

(*) Notice: Subject to any disclaimer, the term of this patent is extended or adjusted under 35 U.S.C. 154(b) by 0 days.

(21) Appl. No.: 17/308,673

(22) Filed: May 5, 2021

(65) Prior Publication Data

US 2021/0395972 A1 Dec. 23, 2021

Related U.S. Application Data

(60) Provisional application No. 63/042,750, filed on Jun. 23, 2020.

(51) Int. Cl.
| | |
|---|---|
| *E02F 3/40* | (2006.01) |
| *E02F 3/96* | (2006.01) |
| *A01D 87/00* | (2006.01) |
| *A01D 87/12* | (2006.01) |

(52) U.S. Cl.
CPC ............ *E02F 3/40* (2013.01); *A01D 87/0076* (2013.01); *A01D 87/127* (2013.01); *E02F 3/96* (2013.01)

(58) Field of Classification Search
CPC .......... E02F 3/40; E02F 3/96; A01D 87/0076; A01D 87/127; B66F 9/12; B66F 9/122
USPC ...... 414/670, 722, 724, 912; 37/405; 172/50
See application file for complete search history.

(56) References Cited

U.S. PATENT DOCUMENTS

| | | | | |
|---|---|---|---|---|
| 2,473,505 A | * | 6/1949 | Brock | E02F 3/962 414/724 |
| 3,312,361 A | * | 4/1967 | Foster | B66F 9/065 414/724 |
| 3,421,642 A | | 1/1969 | Carter | |
| 3,498,485 A | * | 3/1970 | Godbersen | B66F 9/065 414/607 |
| 3,795,331 A | | 3/1974 | Guest | |
| 3,834,567 A | | 9/1974 | Miller | |
| 3,908,844 A | | 9/1975 | Duffield | |
| 4,041,624 A | | 8/1977 | Fryrear | |
| 4,056,205 A | | 11/1977 | Etzler | |
| 4,247,243 A | * | 1/1981 | Carter | B66F 9/12 414/724 |
| 4,306,825 A | | 12/1981 | Yilit | |

(Continued)

*Primary Examiner* — Gregory W Adams
(74) *Attorney, Agent, or Firm* — Stephen D. Carver

(57) ABSTRACT

A conversion kit for converting a front-loader bucket for use as a forklift, a bale transporter or similar object mover. Parallel tine assemblies pivoted to a bucket top include tines that normally project forwardly, and cooperating vertical arms linked to the tines. The arms are fastened at their bottoms within protective elbow brackets to which the tines are pinned. The arms support hollow pivot sleeves penetrated by axle members that enable tine assembly rotation. A plurality of box-like receivers forming sockets enable the quick connection and/or disconnection of parts. Lower receiver sockets removably support pivot sleeves secured to quick-connect plugs that are penetrated by axle segments. A pair of rigid, tine stowage brackets may be secured at the rear. After the projecting tines are unpinned from front mounted elbow brackets, the tine assembly may rotate over the bucket to an out-of-the way position.

8 Claims, 6 Drawing Sheets

(56) References Cited

U.S. PATENT DOCUMENTS

| | | | |
|---|---|---|---|
| 4,405,282 A * | 9/1983 | Carter | E02F 3/962 |
| | | | 414/607 |
| 4,412,768 A | 11/1983 | Bauer | |
| 4,497,607 A * | 2/1985 | Johannson | B66F 9/12 |
| | | | 414/667 |
| 4,634,336 A * | 1/1987 | Pearce | A01D 87/122 |
| | | | 414/679 |
| 4,669,947 A * | 6/1987 | Frost | A01D 87/0053 |
| | | | 37/405 |
| 4,790,717 A * | 12/1988 | Anderson | E02F 3/40 |
| | | | 414/722 |
| 5,090,630 A * | 2/1992 | Kopecky | A01F 29/005 |
| | | | 241/101.76 |
| 5,564,885 A | 10/1996 | Staben | |
| 5,833,424 A | 11/1998 | Bales | |
| 6,287,073 B1 | 9/2001 | Lindgren | |
| 6,820,357 B1 | 11/2004 | Menard | |
| 7,641,436 B2 | 1/2010 | Wippel | |
| 8,069,591 B2 | 12/2011 | Dunn | |
| 2003/0228210 A1 | 12/2003 | Friedland | |
| 2004/0253089 A1 | 12/2004 | Atencio | |
| 2005/0129494 A1 | 6/2005 | Chander | |
| 2008/0175700 A1 * | 7/2008 | McGrane | B66F 9/07563 |
| | | | 414/785 |
| 2008/0232944 A1 | 9/2008 | Kim | |
| 2014/0248111 A1 | 9/2014 | Williams | |
| 2019/0023545 A1 | 1/2019 | Svensson | |

* cited by examiner

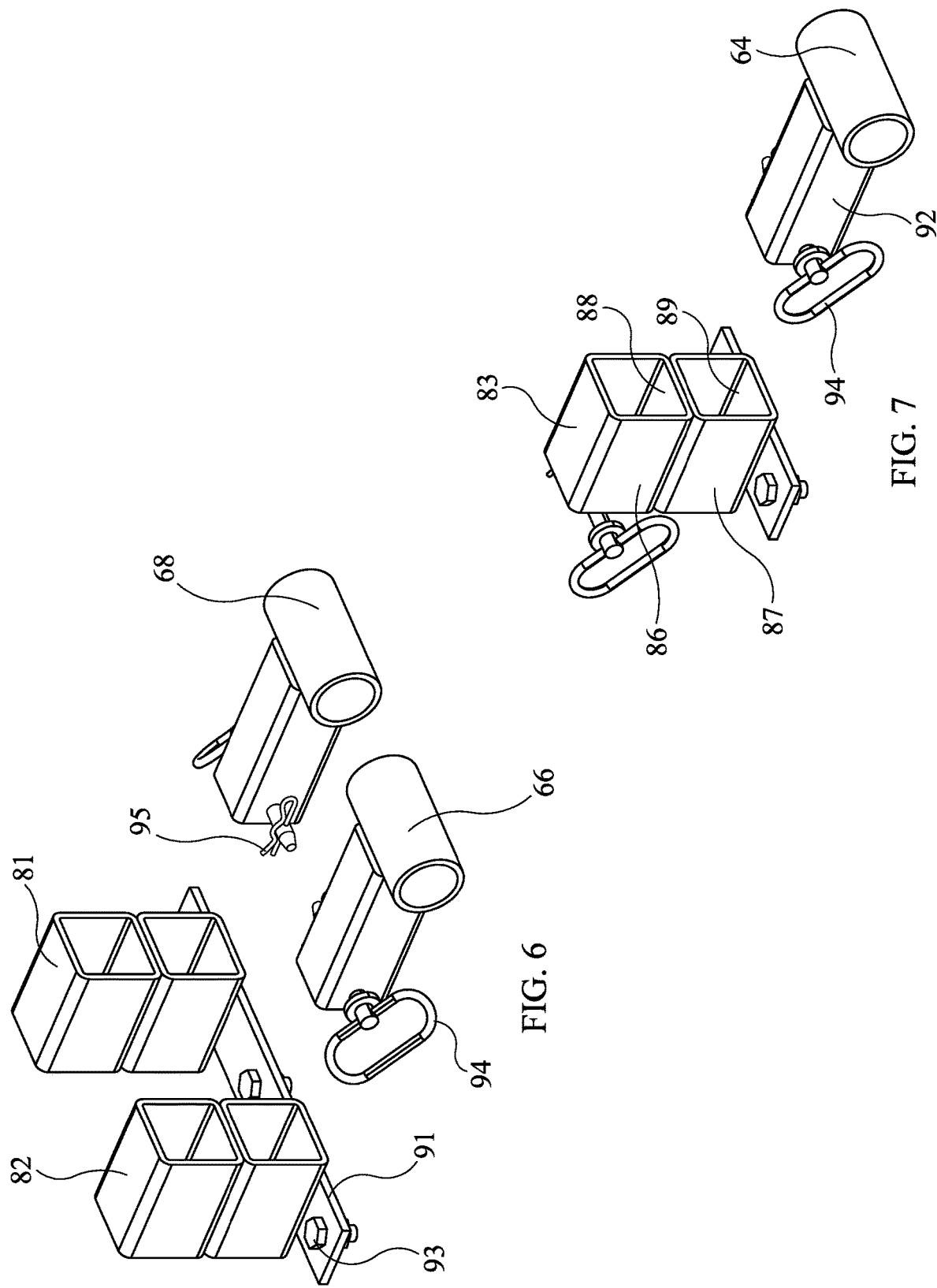

RETROFITTABLE CONVERSION TINE SYSTEM FOR BUCKET LOADERS

CROSS REFERENCE TO RELATED APPLICATION

This utility conversion patent application is based upon, and incorporates by reference, prior U.S. Provisional Patent Application Ser. No. 63/042,750, filed Jun. 23, 2020, by inventor Robert L. Conner, Jr. (American Citizen), which was entitled "Retrofittable Conversion Tine System for Bucket Loaders", and priority from said provisional case is claimed.

BACKGROUND OF THE INVENTION

I. Field of the Invention

The present invention relates generally to earth moving implements and heavy equipment including frontal buckets. More particularly, the present invention relates to a conversion system for providing buckets with forwardly projecting tines or forks to enable the equipment for diverse applications. Representative prior art can be found in CPC class E02F 3/96 and others.

II. Description of the Prior Art

In the construction arts a variety of self-propelled, front end loaders are well known. These machines can perform a variety of construction operations including grading, digging, earth-moving, debris clearing, snow removal and other related tasks. Farm and construction equipment often includes a tractor equipped with a front end loader.

Typical front end loaders may comprise a tractor equipped with a pivoting, hydraulically activated, front frame structure. The frontal frame arrangement may support a pivoted scoop or bucket that can be disposed in various positions for numerous applications, such as digging, excavating, land clearing, material moving and the like. A typical bucket can be rotated about its longitudinal axis between loading, unloading and intermediate positions, and it can be vertically displaced by hydraulic actuators controlled by the tractor for raising and lowering portions of the mounting framework and linkages. Typical buckets or scoops are adept at scooping up and hauling dirt, gravel, debris and the like. Numerous relatively small items such as tree limbs, rocks, debris and dirt can usually be contained within the bucket and easily moved. Additionally, buckets can grade and smooth roadways, fields and gardens.

Accessory attachments for front end, bucket loaders exist, but they are usually limited to specific tasks. When such a front end loader is needed for different functions, it is usually necessary to remove and replace the tool attachment, and substitute a different, better suited tool for the subsequent task. For example, a bucket or scoop may be removed from some front end loaders and then replaced by a fork lift conversion, adapting the tractor for tasks such as pallet moving and stacking.

Fork lifts are widely used for moving objects resting on pallets and for other purposes. Equipment of this type generally includes a motorized truck having a vertically oriented carriage supporting two, spaced-apart, parallel forks or tines that can be vertically displaced with or without a load. Dedicated fork lifts of this general type are advantageous, but the cost of a separate forklift is often prohibitive for smaller businesses such as job shops, "mom and pop" operations, family farms and the like. However, farms and some job shops typically possess at least one maneuverable tractor or truck with a front-end bucket used for diverse purposes. Typical tractors of this genre including a front end bucket arrangement may also be equipped with a rear-mounted, power-operated tool mounted on the three-point hitch to provide multi-purpose dexterity.

In farming operations large, cylindrical hay bales have become common. Typically, round bales are left in the field for drying, but are removed from the field before the next cutting. These bales are too heavy and cumbersome for manual lifting, and power equipment is necessary because of their weight and sheer bulk. Nevertheless, the safe and efficient handling of large bales often remains challenging and tiring. Typical front loading, bucket-equipped tractors of the type suggested above may safely manipulate, lift, transport, and relocate large, cylindrical hay bales, but their speed is limited. Often the moved bale is damaged. Tractors equipped with hydraulic forklifts can handle relatively small transportation ranges, such as moving round bales limited distances into neighboring pens or grazing pastures, but long distance transport has been inefficient and slow.

Of course the buckets may be removed from the tractor, and then tediously replaced with a fork lift conversion or a different bucket. Time constraints in the latter case are prohibitive. One limitation on the use of such equipment is the expense and complexity of mechanically retrofitting the power lift equipment and connecting to on-board hydraulic or electrical systems that may be incompatible and difficult to retrofit. Additionally, reserve capability may be lacking. Further, such retrofit arrangements may require one person to operate the vehicle and another person to operate the hydraulic equipment. Moreover, conventional vehicles may require substantial modifications or updates to both their hydraulic and electronic circuitry. Thus it is advantageous to avoid complete conversion of front end bucket equipment.

In the prior art a plurality of diverse bucket-related conversion devices exist. For example, U.S. Pat. No. 3,795,331 issued Mar. 5, 1974 illustrates an attachment for converting a front end loader bucket to a fork lift. A pair of retro-fittable forks having horizontal lifting elements and cooperating vertical extensions are employed. Brackets secured to the bucket secure the apparatus, but they limit displacement.

U.S. Pat. No. 3,834,567 issued Sep. 10, 1974 discloses an adapter for the conventional bucket of a tractor or high lift to provide the bucket with a plurality of forwardly projecting prongs for handling miscellaneous items such as loose barnyard fertilizer or hay.

U.S. Pat. No. 3,908,844 issued Sep. 30, 1975 shows a fork adapter that attaches to the bottom plate of the scoop of a front end loader.

U.S. Pat. No. 4,056,205 issued Nov. 1, 1977 shows an accessory attachment for a front loader which enables it to manipulate, lift, transport, and dump fibrous material in the form of large bales. The attachment includes a hitch which is fastened to the top surface of the front loader bucket adjacent the bucket opening, and an implement comprising a plurality of tines which are readily affixed to the hitch. In operation, the tines provide a lifting force for the load, and the bucket rim, located below the tines, stabilizes the load.

U.S. Pat. No. 4,041,624 issued Aug. 16, 1977 discloses ripper accessories for hydraulic excavator buckets. The bucket includes a pair of guide sockets, each positioned inwardly of and adjacent a sidewall and the rear wall of the bucket. A pair of ripper shanks are included, one associated with each of the guide sockets, to be extended and retracted relative to the bucket. Each ripper shank may be selectively held in a retracted or an extended position relative to the bucket, and may be completely removed from the bucket if desired.

U.S. Pat. No. 4,306,825 issued Dec. 22, 1981 discloses a round bale carrier for use on a tractor's three-point hitch. The apparatus comprises an elongate frame with a vertical center post and couplings for attachment to the three-point hitch, a plurality of elongate tines pivoted on the frame member, and means on the frame member for independently pivoting each tine in a vertical plane around a pivot on the frame.

U.S. Pat. No. 4,412,768 issued Nov. 1, 1983 discloses a bumper-mounted, hydraulically powered carrier for large, cylindrical hay bales. The unit includes a pair of stationary end bumper sections and a pivotal center bumper section having a pair of sockets for receiving bale piercing spears. A rigid frame secures the bumper to the truck at the customary location for the rear bumper. The center bumper section can be pivoted by hydraulic cylinders in order to load an impaled bale into the truck bed for transport, and to unload the bale back onto the ground.

U.S. Pat. No. 5,564,885 issued Oct. 15, 1996 discloses a work attachment for a front end loader of the type comprising hydraulically-actuated frame arms at the front of the vehicle. The work attachment comprises a scoop or bucket in combination with a laterally extending row of ripper teeth mounted along a lower edge and adapted for hydraulic actuation between an upper stored position and a downwardly extending, deployed position for ripping earth upon vehicle movement in a reverse direction.

U.S. Pat. No. 3,789,524 issued February 1974 provides attachments for use with skid-steer front end loaders, enabling the performance of a multitude of different tasks.

U.S. Pat. No. 5,833,424 issued Nov. 10, 1998 discloses a hand-operated hay bale lifter including a square coupling bar that can be quickly and easily inserted into the receiver of a standard tow bar trailer hitch. Mechanical lifting force produced by a hydraulic jack assembly is transferred to a fork assembly through a contact coupling. The fork assembly can be quickly elevated by hand and locked in an upright travel/storage position.

U.S. Pat. No. 6,287,073 issued Sep. 11, 2001 shows a detachable support frame for holding a pair of laterally adjustable, load-carrying forks. The load-bearing forks are mounted on first and second elongated beams.

U.S. Pat. No. 6,820,357 issued Nov. 23, 2004 discloses a multi-purpose tool for a front end loader of a tractor. An intermediate support frame secures an upper jaw assembly having a plurality of interconnected forwardly extending, spaced-apart parallel fingers, and a lower stationary jaw assembly including a plurality of interconnected, forwardly extending and parallel fingers fixedly mounted to the bottom edge of the intermediate support frame. Actuation of a hydraulic system causes the upper jaw assembly to pivot towards or away from the lower stationary jaw assembly. The multi-purpose tool is capable of performing a variety of specialized tasks.

U.S. Pat. No. 7,641,436 issued Jan. 5, 2010 provides a bale tote implement for a skid steer vehicle. The implement includes a plurality of substantially hollow gathering teeth having a first end and a second end. The first end is substantially flattened and the second end includes a support dowel inserted therein. Slots are configured to receive the second end of the gathering teeth.

U.S. Pat. No. 8,069,591 issued Dec. 6, 2011 shows a multi-purpose attachment for work vehicles comprising a bucket and tine arrangement permitting the attachment to be used when performing a variety of jobs. The attachment may also include a thumb that can be extended over the open front of the bucket, retracted and folded when not in use.

U. S. Publication No. 2003/0228210 published Dec. 11, 2003 discloses a fork lift attachment for a multi-purpose bucket. The mechanism fits under the bucket and is supported by a slot on the top side of a tine and a latch at the heel of the tine. The latch is tightened causing the fork lift attachment to be cinched onto the bucket. A security chain readily and visibly secures the latch so as to prevent the fork lift attachments from being dislodged even if the hydraulics open the bucket.

U. S. Publication No. 2004/0253089 published Dec. 16, 2004 shows a bale-impaling spear for a loader bucket. A plurality of sockets carried by the bucket frame selectively mount elongated tines.

U. S. Publication No. 2005/0129494 published Jun. 16, 2005 discloses a forklift adapter with a tine portion extending generally horizontally forwardly, a leg portion extending generally vertically along a vertical axis, and a top extending generally rearwardly from near the top of the leg portion. The leg portion includes an upper leg member and a slidably coupled lower leg member making it extensible.

U. S. Publication No. 2008/0232944 published Sep. 25, 2008 discloses a fork device for forklift trucks wherein the forks can be rotated upwardly and folded by rotation of a hydraulic motor when a driver manipulates a lever, thus allowing the forklift truck to move with the forks in a folded state.

U. S. Publication No. 2014/0248111 published Sep. 4, 2014 discloses a clamp-on fork lift attachment with spaced tines which that may be temporarily secured to the blade portion of a loader bucket used on equipment.

U. S. Publication No. 2019/0023545 published Jan. 24, 2019 relates to a mounting device for mounting a fork comprising at least one blade on a machine bucket.

Many of the above-discussed prior art conversion devices add to the dexterity of the bucket arrangement, and many can be quickly installed and/or removed. However, as discussed above, the hydraulic front end of such bucket loaders conventionally enables a wide range of movements. For example, the bucket may be moved upwardly or downwardly a considerable vertical distance. Concurrently or separately the bucket may be rotated about a longitudinal axis to forwardly engage a load, it may be rotated to smoothly apply its bottom surface over a road or area to be treated, or it may be reversed completely to enable rearwardly projecting tines or scarifiers to engage and dig into the ground when the tractor is driven rearwardly. The vast number of possible operational orientations of the bucket thus makes it more likely that irregular or projecting accessories will interfere with operations, and scrape or damage neighboring structures and equipment.

It is thus desirable to provide a bucket accessory system that can be selectively retracted and displaced into a safely obscured out-of-the way position. It is suggested that a protectively nested or shrouded orientation of the bucket accessories at the rear of the bucket would be highly desirable and less cumbersome than known prior art solutions, minimizing potentially dangerous structural collisions and interference.

SUMMARY OF THE INVENTION

The invention comprises a conversion kit or accessory for adapting a conventional bucket loader for different uses and functions that the OEM product is incapable of executing. Another form of the invention includes a bucket or scoop equipped with the kit.

The preferred kit comprises a plurality of structural elements that function harmoniously together to enable conversion of a conventional bucket loader (or a front mounted blade) into a forklift or bale transporter, or any other mechanical loading device requiring forwardly projecting tines for engaging, supporting and/or impaling a load. At least a pair of parallel, and pivoted tine assemblies include one or more projecting tines or prongs that normally extend forwardly from the vehicle-mounted bucket, and associated arms linked to the projecting tines. Normally the arms are generally perpendicular to the horizontal tines and oriented vertically in use. The arms support hollow pivot sleeves on the bucket or scoop top that function as bearings to enable tine assembly rotation. The arms are fastened at their bottoms within protective elbow brackets, to which the projecting tine inner ends are pivoted and pinned. The elbow brackets assume a nested position in operation upon the lower bucket or scoop interior surface at the machine front.

The top of the bucket supports a plurality of spaced apart, box-like receivers forming sockets for the quick connection and/or disconnection of parts. The receivers include lower flanges for semi-permanently fastening them to the top of the bucket or scoop. Each receiver preferably comprises a pair of integral, vertically spaced-part sockets. Lower sockets adjacent the flanges support cooperating integral, upper sockets. The integral upper sockets can mount other diverse accessories such as tow hooks, ancillary tines, miscellaneous brackets, lighting components or other tools or accessories.

The receiver lower sockets removably support pivot sleeves secured to quick-connect plugs. At least one tine assembly axle segment extends horizontally across the top of the bucket or scoop. The axle segment(s) are journalled by aligned pivot sleeves supported by the lower receiver sockets. In the best mode, there are two aligned axle segments, each of which is journaled through and pivoted by at least a pair of spaced-apart pivot sleeves projecting from the receivers that horizontally secure the axle segments above the bucket. A single, continuous tine assembly axle may be used. The tine assembly axle or its segments penetrate and are thus journaled through the tine pivot sleeves mentioned above, enabling the tines extending from the pivot sleeves to be rotated about the tine axle or axle segments.

A pair of rigid, tine stowage brackets are secured at the rear of the bucket or scoop. Each stowage bracket comprises a generally cubical housing for shrouding a projecting tine end in an out-of-the-way orientation. The projecting tines may be unpinned from the front-mounted elbow brackets, enabling the whole tine assembly to rotate over the scoop or bucket to an out-of-the way position. After rotation, the front of each projecting tine can be secured by pinning within the stowage bracket in a rotated, substantially vertical orientation. Thus, to position the tine assemblies in an out-of-the-way storage position, the tines are unpinned from the front elbows, and then rotated over the top of the bucket or scoop towards the rear.

In the stowage orientation the tine assembly arms are rotated 180 degrees from their normal operational position, projecting vertically upwardly at the front of the bucket, instead of downwardly. At the same time the normally horizontal projecting tines are pivoted downwardly from the elevated elbows, and are secured within a tine stowage bracket, substantially parallel with the bucket rear surface or similar scoop structure.

Thus a basic object of my invention is to provide an adaptor, in the form of a kit, for equipping ground-engaging tools used with front end loaders, tractors or the like with forwardly projecting tines, forks or prongs that may be used for engaging and moving diverse objects.

Another basic object is to provide an adaptor kit for earth engaging buckets, scoops or the like with forwardly projecting tines, forks or prongs that may be used for moving or engaging diverse objects, and which can easily be shifted to a stowage position.

A related object is to provide a kit of the character described including removable tines that can be readily folded away into a stowage position at the rear of the bucket.

Yet another object of the present invention is to provide a conversion adapter of the character described which may be readily attached to the conventional scoop or blade of a front end loader, tractor, or similar implement.

Another object is to provide a conversion means whereby a conventional bucket or blade may be readily enabled to manipulate, lift, transport, secure, and dump a large heavy hay bale of the cylindrical type.

Thus a related object is to provide a conversion for a bucket loader or scoop-equipped device which will enable large and heavy bales to be handled easily and efficiently.

More specifically it is an object to provide a removable tine or prong conversion for a front end loader which will safely enable the handling and manipulation of conventional "square" bales or larger, heavy cylindrical bales. It is a feature of the invention that the spacing between the primary tines can be quickly adjusted as needed to fit the target object to be moved.

Another related object is to provide a conversion means whereby a conventional bucket or blade may support horizontally projecting tines or prongs that enable a fork lift function.

It is a further object to provide a conversion means for a front bucket loader which is easily and quickly mounted or unmounted from the loader by a single person.

Another basic object of the invention is to provide at least one hay bale spear that is subject to rapid modification by the user for lifting and carrying pallets, fencing and the like.

A further object of the present invention is to provide a conversion kit of the type noted which cannot be inadvertently separated from the basic structure during operation of the bucket and/or lift arms.

Another important object is to provide a braced stowage position for the retracted tines.

It is also an object to provide ground-engaging tools used with front end loaders, bucket trucks or other earth movers having scoops or blades with a conversion kit of the character described.

Furthermore it is an object to provide a tine kit of the character described that can be quickly and easily retracted to an out-of-the-way stowage position.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 6 is an enlarged fragmentary isometric view of preferred receivers and pivot sleeves; and, FIG. 7 is an enlarged, fragmentary isometric view showing a single receiver and pivot sleeve.

DETAILED DESCRIPTION

Figure 1:
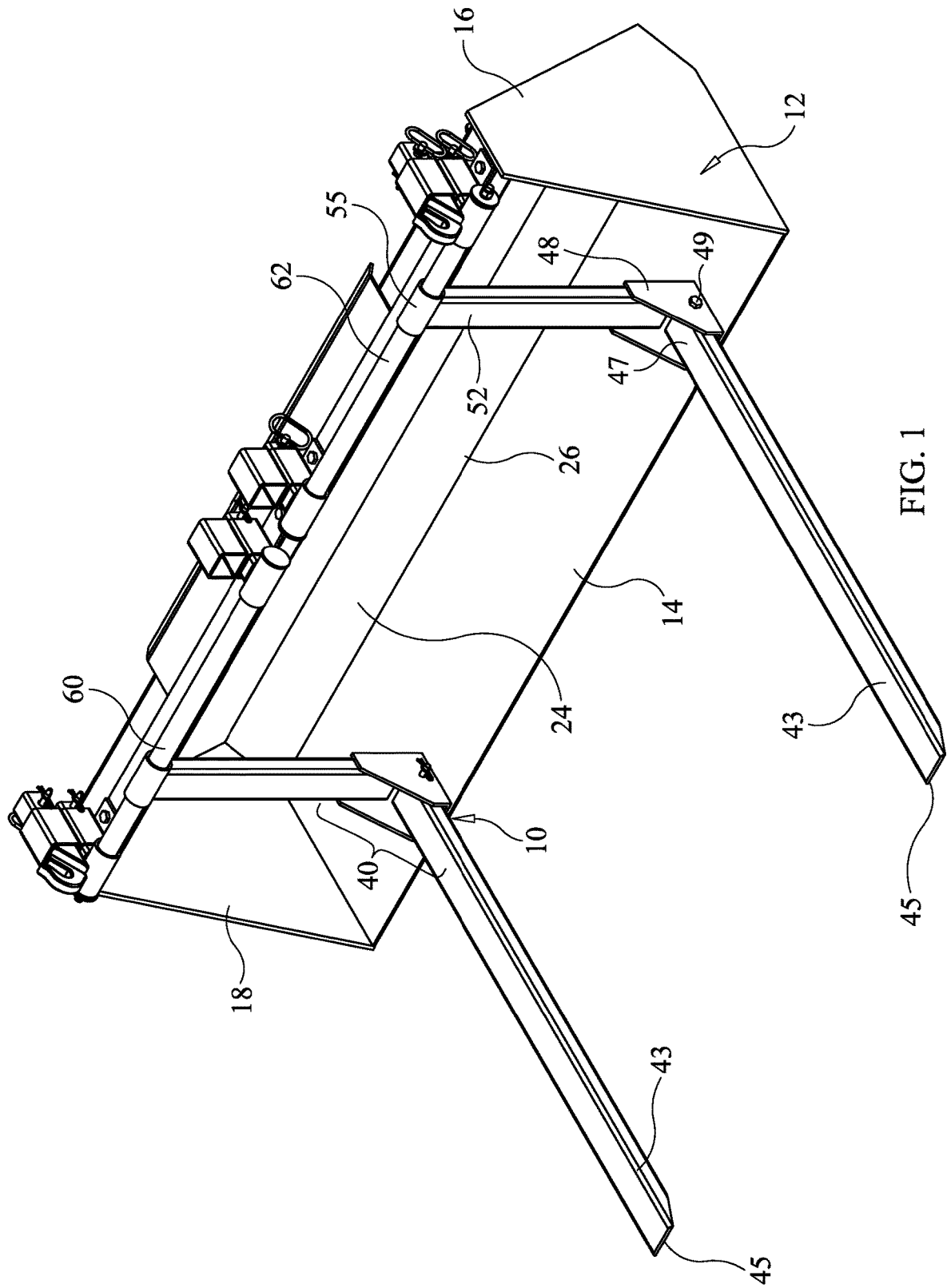
FIG. 1 is a frontal isometric view showing a conventional front end loader bucket with the instant invention mounted upon it, with the projecting tines disposed in an operational orientation.
Figure 4:
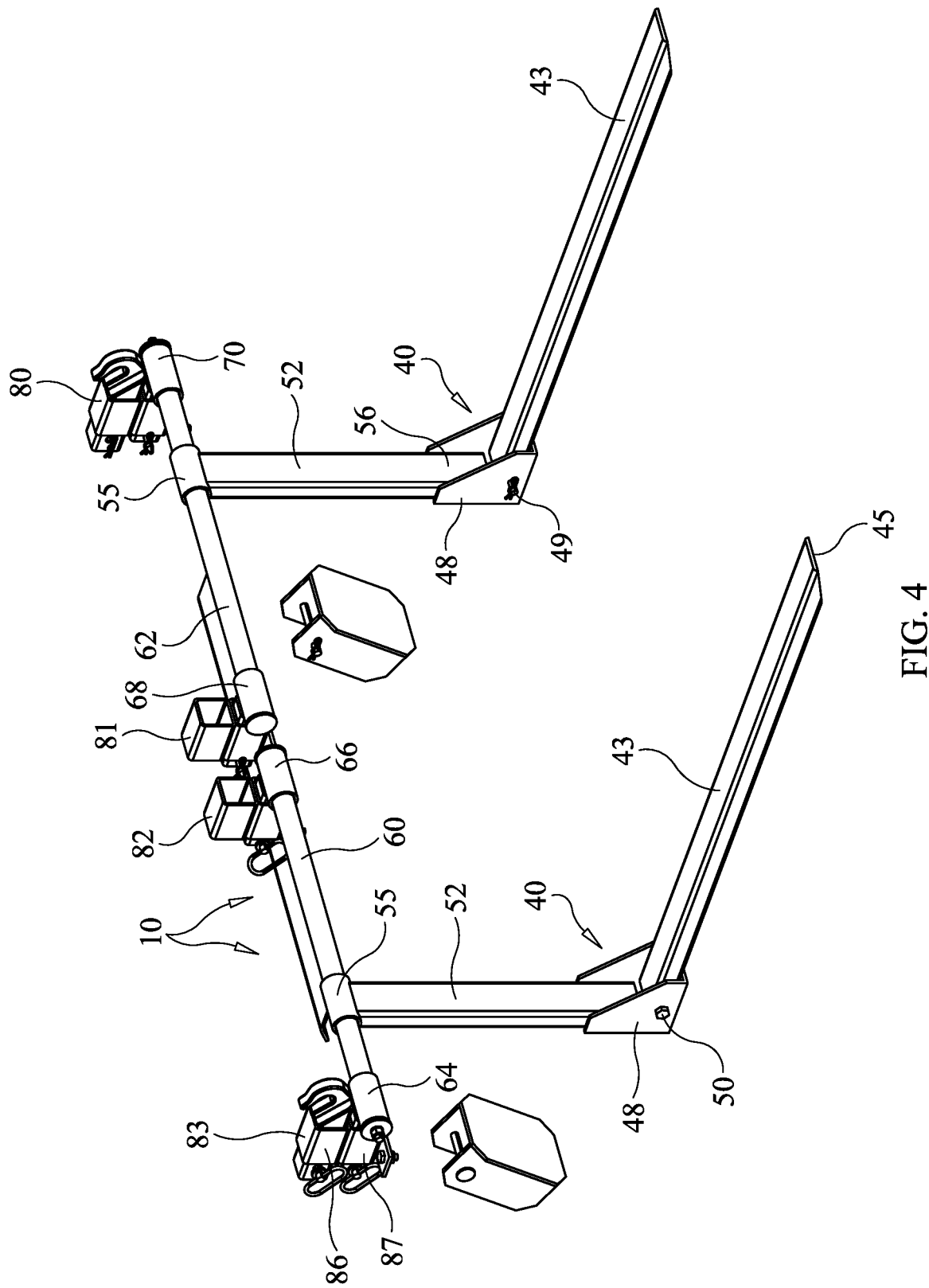
FIG. 4 is a partially exploded, isometric assembly view of the preferred conversion kit.
Figure 5:
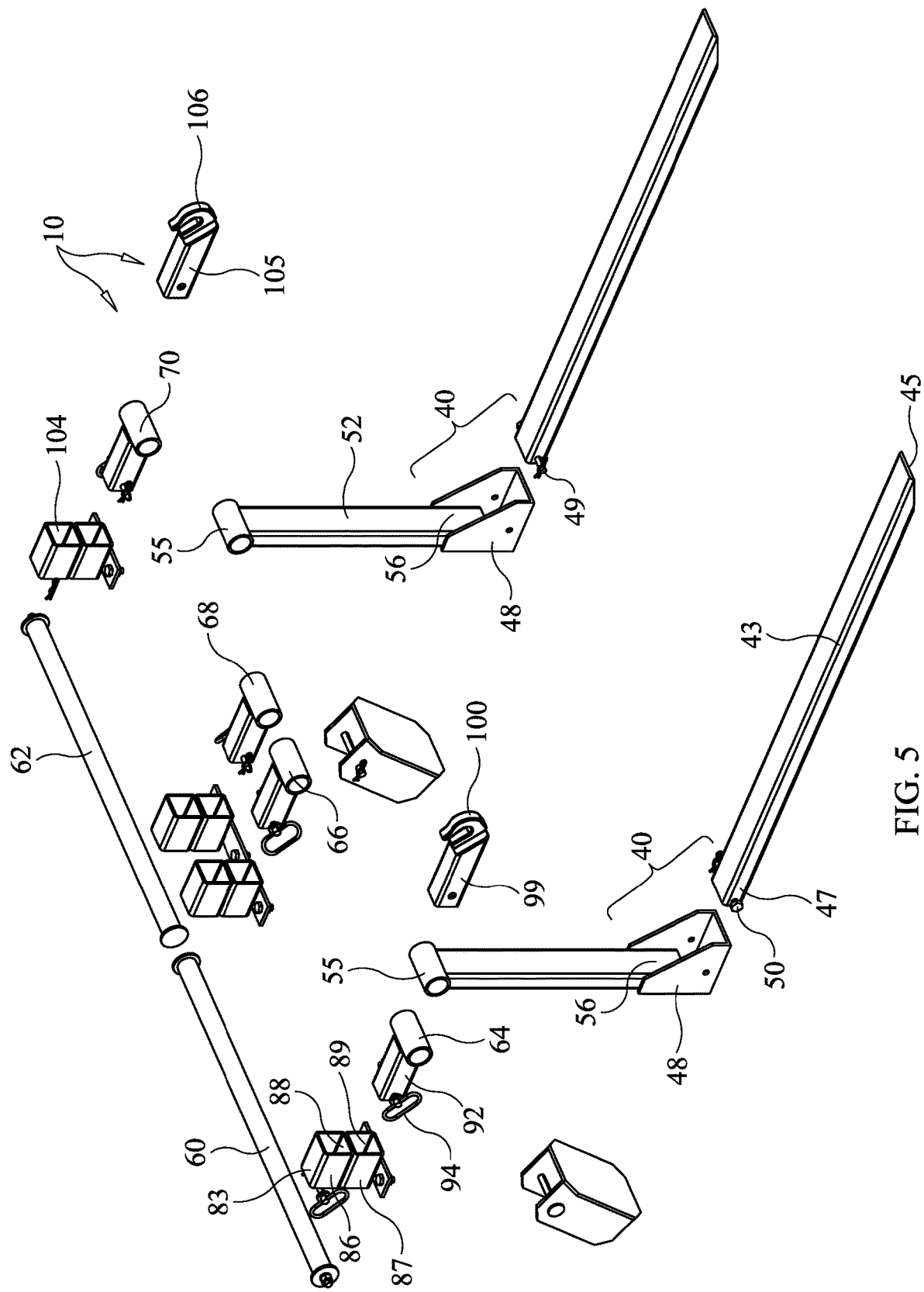
FIG. 5 is an exploded isometric assembly view of the preferred conversion kit.

Turning now to the drawings, and with particular reference directed initially to FIGS. 1, 4 and 5, a retrofittable conversion tine kit constructed in accordance with the best mode of the invention has been generally designated by the reference numeral 10. While conversion kit 10 is designed to be mounted upon a conventional front end loader bucket 12, it will be understood that the kit 10 may be mounted on similar construction and earth moving equipment including front end implements like bulldozer blades, various scoops, and other diverse ground engaging or earth moving tools known in the art; as used herein the term "bucket" shall include all of the latter elements.

A conventional bucket 12 (FIG. 1) comprises several steel plates or panels that are welded together to form the required geometry. A flat steel bottom panel 14 extends between two spaced apart, substantially triangular end panels 16 and 18. As seen best in FIG. 3, there is an elongated, substantially rectangular rear panel 20 extending between end panels 16 and 18. Rear panel 20 is inclined slightly relative to flat bottom panel 14. A reduced width top panel 22 of generally rectangular proportions extends across the bucket, between end panels 16 and 18. There is an open bucket interior 24 formed between the intersecting panels generally beneath top panel 22 and above bottom panel 14 between end panels 16 and 18. An elongated and rectangular gusset reinforcement plate 26 extends across the bucket interior 24, extending at an angle between the rear panel 20 and the bottom bucket panel 14.

As detailed below, portions of the kit 10 are mounted upon bottom panel 14, upon rear panel 20, and upon the bucket top panel 22. The preferred kit structural elements function together to convert a conventional bucket loader (or blade or scoop) into a forklift or bale transporter, or any other device requiring forwardly projecting tines.

Figure 2:
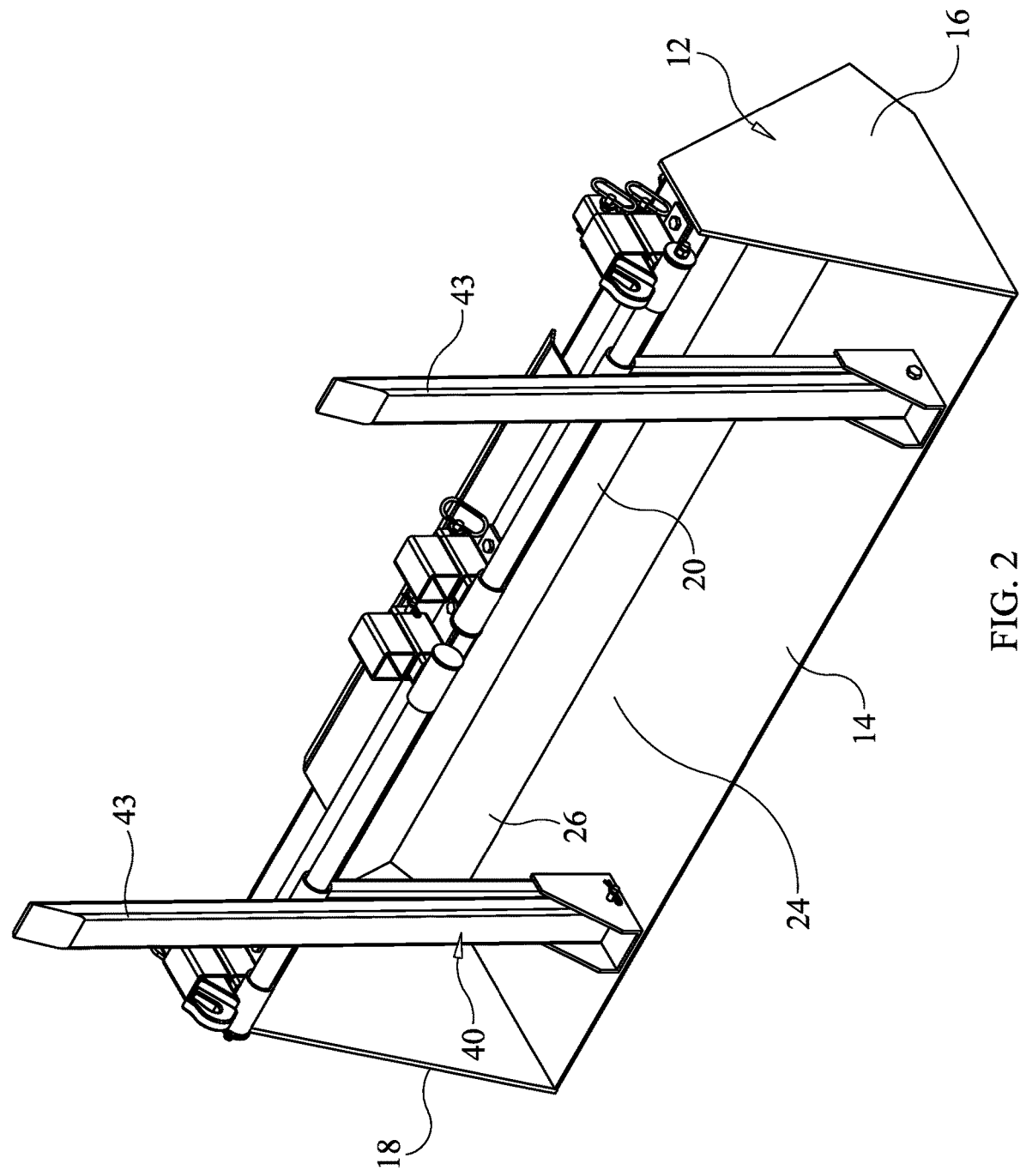
FIG. 2 is a frontal isometric view similar to FIG. 1, but showing the tines in intermediate, partially folded position prior to assuming a stowage orientation.

In the best mode there are a pair of similar tine assemblies 40 (FIG. 1) that are spaced apart and adjustably, slidably mounted over the bucket 12. The tine assemblies 40 may be disposed in an operational position seen in FIG. 1, or they may be disposed in a stowage position illustrated in FIG. 3. When being switched between operational and stowage positions, the intermediate position of FIG. 2 results.

Each tine assembly 40 comprises at least one elongated, projecting tine 43 that, in normal operation, projects straight out from the bucket 12 (FIG. 1) substantially horizontally. Projecting tines 43 are normally "horizontal" in operation, but they may be rotated to non-horizontal positions (i.e., FIGS. 2, 3) for stowage. Each projecting tine 43 has a tapered but somewhat blunt frontal point 45 and an integral rear end 47 that is hinged to a rigid elbow bracket 48 with a removable pivot pin 49. The generally cubical elbow brackets 48 are frictionally wedged against the bottom of the bucket 12 and the surface of bottom panel 14 when the tine 32 engages an object, such as a hay bale, and presses forwardly.

Each tine assembly 40 also comprises an associated "vertical" arm 52 terminating at its top in an integral, transversely extending pivot sleeve 55 that, in effect, functions as a bearing to enable tine assembly rotation. The arms 52 are described as "vertical" herein for clarity, as they are disposed vertically or perpendicularly in normal operation. Vertical arms 52 terminate at their bottoms within the elbow brackets 48, with the bottoms 56 (FIG. 4) of the vertical arms 52 being snugly fitted within and firmly welded to the elbow bracket 48. The junction of each tine 43 and arm 52 is thus shrouded within a protective elbow bracket 48, that assumes a nested position in operation upon the lower bucket interior surface of bottom panel 14.

Tine assemblies 40 are thus pivoted relative to the bucket 12 by the pivot sleeves 55 through an axle. These bearing-like sleeves 55 are coaxially penetrated and journaled by separate aligned tine axle segments 60 and 62 (FIG. 4) that preferably extend horizontally across the top panel 22 (FIG. 3) of the bucket. In the best mode, there are two axially aligned tine axle segments 60 and 62, although a single tine axle could be used. By employing a split or segmented tine axle design (i.e., FIG. 4) extra strength is achieved. Each tine axle segment 60, 62 is thus journaled through spaced apart, support sleeves; this enables tine assembly position to be horizontally adjusted to fit the intended target. For example axle segment 60 is journaled through and extends horizontally between axle support sleeves 64, 66. Similarly, axle segment 62 extends between companion support sleeves 68 and 70 in axial alignment with axle segment 60. Various receivers, described in detail below, are secured atop the bucket to mount the aforementioned pivot sleeves that are spaced outwardly from the receivers and horizontally secure the axle segments above the bucket. The spaced apart, box-like receivers form sockets for the quick connection and/or disconnection of plugs linked to critical components.

Referencing FIGS. 4-6, a receiver 83 mounts axle support sleeve 64 and a spaced apart receiver 82 mounts axle support sleeve 66. Receivers 81 and 80 respectively mount support sleeves 68 and 70. All of these receivers are substantially similar, so only receiver 83 (i.e., FIGS. 4, 5 and 7) will be described in detail.

Preferably each receiver comprises a pair of vertically stacked, generally cubicle, hollow steel tubes 86 and 87 that form internal sockets 88 and 89 (FIG. 5) respectively. Each receiver is secured to the bucket top panel 22 (i.e., FIG. 3) by a mounting flange 91 that is removably secured in place by suitable fasteners 93. Support sleeve 64 (i.e., FIG. 5) is transversely mounted astride a plug 92 that is fitted within receiver socket 89, and secured by a pin 94. The opposite ends of the pins 94 may be further secured with cotter pins 95. Thus the axle support sleeves 64, 66, 68 and 70 are similarly removably held by detachable plugs fitted into suitable sockets provided by the various receivers on top of the bucket.

The receiver upper sockets, like socket 88 can removably mount other diverse accessories such as tow hooks, ancillary tines, other miscellaneous tools. In FIG. 5 for example, it is seen that an upper receiver socket 104 can removably receive a plug 105 that mounts a rigid hook 106.

Importantly, means are provided for substantially rigidly and non-destructively positioning the tine assemblies 40 for stowage. At the rear of the bucket 12 there are a pair of rigid, spaced apart stowage brackets 110 and 112 (FIG. 3) secured upon rear panel 20. Each stowage bracket 110, 112 comprises parallel sides 114, 115 forming a generally rectangular housing for bracing the projecting tine 43 in an out-of-the-way orientation, with end 45 of the now-vertical projecting tine 43 captivated between bracket sides 114 and 115 and removable pin 118.

Figure 3:
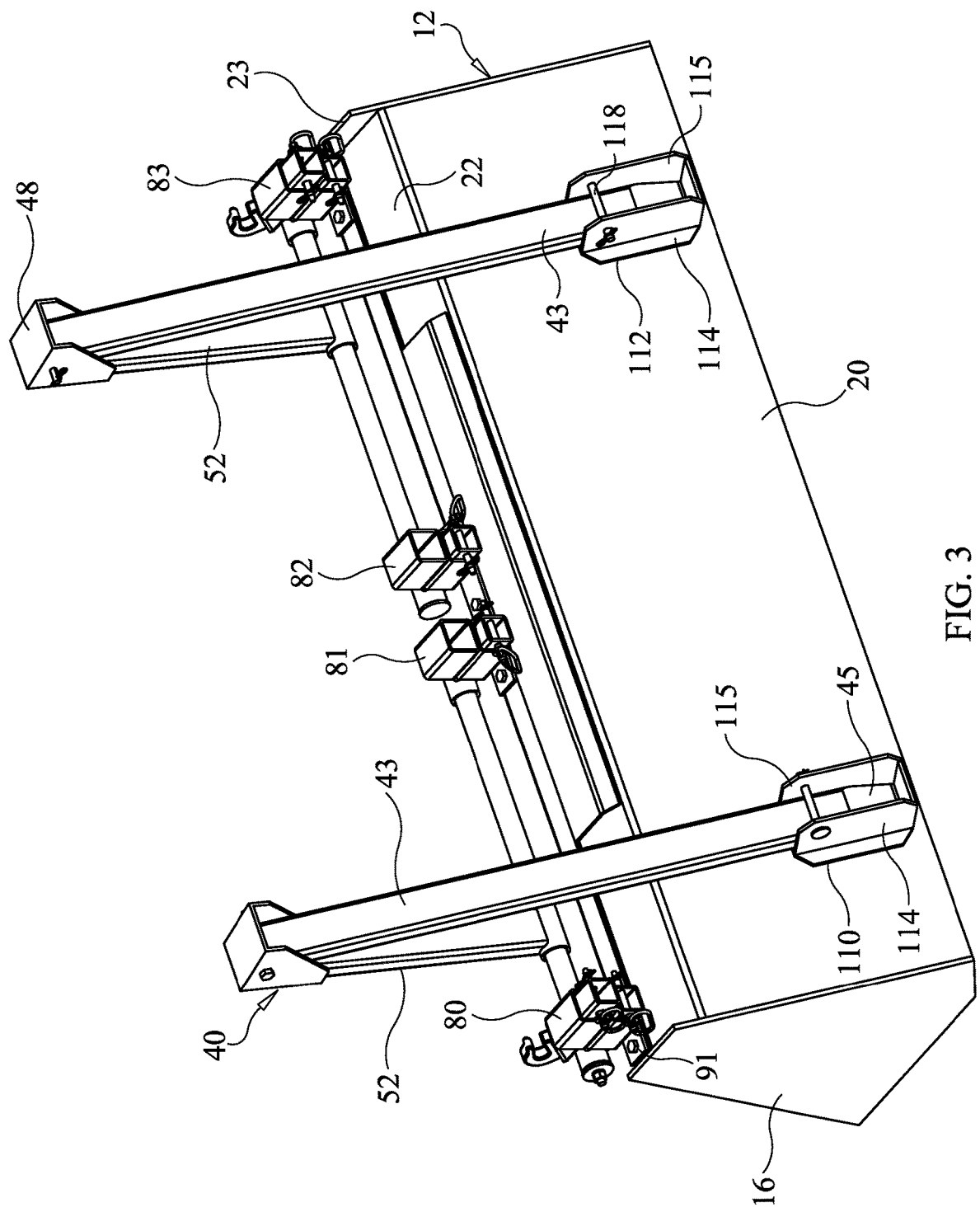
FIG. 3 is a rear isometric view showing the tines in a folded and retracted secure stowage position.

To position the tine assemblies 40 in the preferred out-of-the-way storage position engaging brackets 110 or 112, the tines 43 are first pivoted relative to an elbow bracket 48 and folded upwardly to the substantially vertical position of FIG. 3. Then the axle assemblies 40 may be rotated about the tine axles segments 60 and/or 62 until assuming the position substantially as in FIG. 3. In the stowage orientation the vertical tines 52 are rotated 180 degrees from their normal downwardly descending position of FIG. 1.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A conversion kit for adapting a conventional front-end loader having a bucket or scoop for use as a bale transporter, forklift or other device requiring at least one outwardly projecting front prong, the kit comprising:
    at least one tine assembly pivotally mounted to the bucket or scoop, each tine assembly comprising a rigid, projecting tine that normally extends forwardly, and a rigid arm linked to the projecting tine;
    an elbow bracket normally disposed at the front of the loader;
    the arm having a bottom fastened to the elbow bracket and a spaced apart top;
    the projecting tine comprising a frontal point adapted to engage a target, and a spaced apart inner end pivoted to the elbow bracket proximate the arm;
    at least one hollow pivot sleeve proximate the bucket top supported by said arm that functions as a bearing to enable tine assembly rotation;
    at least one axle segment proximate the bucket top that penetrates at least one pivot sleeve;
    at least one receiver forming at least one socket for the quick connection and/or disconnection of parts;
    wherein at least one quick-connect plug that engages a socket rotatably secures at least one axle sleeve for mounting said at least one axle segment; and,
    at least one rigid, tine stowage bracket adapted to be secured at the rear of the bucket for receiving and shrouding a projecting tine when the tine assembly is rotated over the bucket such that the projecting tine extends vertically downwardly into the stowage bracket.

2. The conversion kit as defined in claim 1 wherein the vertical arms are generally perpendicular to the projecting tines.

3. A retrofittable tine kit for converting a conventional front-end loader bucket or scoop for use as a bale transporter, forklift or other device requiring at least one outwardly projecting front prong, the kit comprising:
    at least one pair of tine assemblies pivotally mounted to the bucket or scoop, each tine assembly comprising a rigid, projecting tine that normally projects forwardly, and a rigid vertical arm linked to the tine;
    an rigid elbow bracket adapted to be disposed at the front of the bucket;
    the arm having a bottom fastened to the elbow bracket and a spaced apart top;
    the projecting tine comprising an outwardly projecting frontal point adapted to engage or support a target, and a spaced apart inner end pivoted to the elbow bracket proximate the arm;
    at least one axle segment proximate the bucket top supported by a plurality of spaced apart axle support sleeves;
    each tine assembly comprising a pivot sleeve penetrated by said at least one axle segment thereby enabling rotation of said tine assembly for stowage;
    further comprising at least one box-like receiver socket for the quick connection and/or disconnection of parts, said at least one receiver socket removably receiving quick-connect plugs that support said axle sleeves; and,
    at least one rigid, tine stowage bracket adapted to be secured at the rear of the bucket for receiving and shrouding the tine point when the tine is rotated over the axle and disposed in a stowage position.

4. The conversion kit as defined in claim 3 wherein the vertical arms are generally perpendicular to the projecting tines.

5. A conversion kit for adapting a conventional front-end loader having a bucket or scoop for use as a bale transporter, forklift or other device requiring at least one outwardly projecting front prong, the kit comprising:
    at least one pivotally mounted tine assembly, each tine assembly comprising a rigid, projecting tine and a rigid arm linked to the projecting tine, the arm having a spaced apart top that supports at least one pivot sleeve;
    the projecting tine comprising a frontal point adapted to engage a target;
    at least one axle segment proximate the bucket that penetrates at least one tine assembly pivot sleeve thereby enabling tine assembly rotation and tine assembly horizontal displacement;
    at least one receiver forming at least one quick connect socket; and,
    at least one quick-connect plug that removably engages said quick connect socket, said plug supporting at least one axle support sleeve that mounts said at least one axle segment.

6. The conversion kit as defined in claim 5 further comprising at least one tine stowage bracket for shrouding a projecting tine when the tine assembly is rotated over the bucket.

7. A front-end loader having a bucket or scoop for use as a bale transporter, forklift or other device, the loader comprising:
    at least one pivotally mounted tine assembly, each tine assembly comprising a rigid, projecting tine and a rigid arm linked to the projecting tine, the arm having a spaced apart top that supports at least one pivot sleeve;
    the projecting tine comprising a frontal point adapted to engage a target;

at least one axle segment proximate the bucket that penetrates at least one tine assembly pivot sleeve thereby enabling tine assembly rotation and tine assembly horizontal displacement from side to side near the bucket;

at least one receiver mounted atop the bucket that forms at least one quick connect socket; and, at least one quick-connect plug that removably engages said quick connect socket, said plug supporting at least one axle support sleeve that mounts said at least one axle segment for pivotally mounting each tine assembly.

8. The loader as defined in claim 7 further comprising at least one tine stowage bracket for shrouding a projecting tine when the tine assembly is rotated over the bucket.

* * * * *